United States Patent
Sugimura

(10) Patent No.: US 9,563,289 B2
(45) Date of Patent: Feb. 7, 2017

(54) INFORMATION INPUT DEVICE AND NON-TRANSITORY COMPUTER-READABLE MEDIUM STORING COMPUTER-READABLE INSTRUCTIONS

(71) Applicant: Brother Kogyo Kabushiki Kaisha, Nagoya-shi, Aichi-ken (JP)

(72) Inventor: Yoshihiko Sugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/481,980

(22) Filed: Sep. 10, 2014

(65) Prior Publication Data
US 2015/0084891 A1    Mar. 26, 2015

(30) Foreign Application Priority Data
Sep. 24, 2013 (JP) ................................ 2013-197501

(51) Int. Cl.
*G06F 3/0354* (2013.01)
*G06F 3/041* (2006.01)
*G06F 3/046* (2006.01)
*G06K 9/22* (2006.01)

(52) U.S. Cl.
CPC .......... *G06F 3/03545* (2013.01); *G06F 3/046* (2013.01); *G06K 9/222* (2013.01)

(58) Field of Classification Search
USPC ............. 345/156–179; 349/12; 382/187, 119
See application file for complete search history.

(56) References Cited

U.S. PATENT DOCUMENTS 5,583,946 A * 12/1996 Gourdol .............. G06F 3/04883
345/179
2004/0028274 A1* 2/2004 Kawakami ............. G06K 9/222
382/187

FOREIGN PATENT DOCUMENTS

JP          H05-067236 A      3/1993

* cited by examiner

*Primary Examiner* — Jennifer Mehmood
*Assistant Examiner* — Deeprose Subedi
(74) *Attorney, Agent, or Firm* — Banner & Witcoff, Ltd.

(57) ABSTRACT

An information input device includes a detection portion, a processor, and a memory. The detection portion is configured to detect a position of a writing portion being in contact with or close to the detection portion. The memory is configured to store computer-readable instructions. The computer-readable instructions, when executed by the processor, cause the information input device to perform processes that include acquiring position information at a predetermined time interval, setting, as first position information, information indicating one of positions indicated by the acquired position information, determining whether a distance between a position indicated by the set first position information and a position indicated by second position information is less than a threshold value, and storing, as information configuring trajectory information, the second position information in a storage portion in response to determining that the distance is not less than the threshold value.

9 Claims, 6 Drawing Sheets

INFORMATION INPUT DEVICE AND NON-TRANSITORY COMPUTER-READABLE MEDIUM STORING COMPUTER-READABLE INSTRUCTIONS

CROSS-REFERENCE TO RELATED APPLICATION

This application claims priority to Japanese Patent Application No. 2013-197501 filed Sep. 24, 2013, the content of which is hereby incorporated herein by reference.

BACKGROUND

The present disclosure relates to an information input device that can acquire information input on a booklet-like recording medium in which a plurality of paper sheets are bound, and a non-transitory computer-readable medium storing computer-readable instructions.

An information input device is known that can digitize written content by reading a trajectory of a writing tool using a digitizer in a pad, when a character, a graphic, etc. are written on a paper medium on the pad using the writing tool. The digitizer detects a position of the writing tool that is in contact with or is close to a detection surface of the digitizer. The digitizer converts the detected position into coordinate data, taking the detection surface as an X-Y plane, and outputs the coordinate data to the information input device. The information input device samples the coordinate data output by the digitizer at a certain speed, and can acquire, as trajectory information, an aggregate of the coordinate data that can reproduce the trajectory of the writing tool. See, e.g., JP H5-67236A

SUMMARY

In a case where the writing speed using the writing tool is slow, if the coordinate data is sampled at a certain speed, in the same manner as in a case where the writing speed is fast, many pieces of coordinate data of proximate positions are obtained. Particularly, in a case where the writing tool stays in the same position for some time during writing, it is possible that the same coordinate data is consecutively acquired and the amount of data of the trajectory information is increased.

Embodiments of the broad principles derived herein provide an information input device and a non-transitory computer-readable medium storing computer-readable instructions that are capable of suppressing an increase in an amount of data of trajectory information by thinning out coordinate data of the same position or proximate positions.

Embodiments provide an information input device that includes a detection portion, a processor, and a memory. The detection portion is configured to detect a position of a writing portion being in contact with or close to the detection portion. The memory is configured to store computer-readable instructions. The computer-readable instructions, when executed by the processor, cause the information input device to perform processes that include acquiring position information at a predetermined time interval, the position information being information of the position detected by the detection portion, setting, as first position information, information indicating one of positions indicated by the acquired position information, determining whether a distance between a position indicated by the set first position information and a position indicated by second position information is less than a threshold value, the second position information being position information acquired after the first position information is acquired, and storing, as information configuring trajectory information, the second position information in a storage portion in response to determining that the distance is not less than the threshold value. The trajectory information is information indicating a trajectory of the writing portion. The setting, as the first position information, the information indicating the one of the positions indicated by the acquired position information includes setting, as the first position information, the second position information stored in the storage portion.

Embodiments also provide a non-transitory computer-readable medium storing computer-readable instructions that, when executed by a processor of an information input device, cause the information input device to perform processes that include acquiring position information at a predetermined time interval, the position information being information of a position detected by a detection portion, the detection portion being configured to detect a position of a writing portion being in contact with or close to the detection portion, setting, as first position information, information indicating one of positions indicated by the acquired position information, determining whether a distance between a position indicated by the set first position information and a position indicated by second position information is less than a threshold value, the second position information being position information acquired after the first position information is acquired, and storing, as information configuring trajectory information, the second position information in a storage portion in response to determining that the distance is not less than the threshold value. The trajectory information is information indicating a trajectory of the writing portion. The setting, as the first position information, the information indicating the one of the positions indicated by the acquired position information includes setting, as the first position information, the second position information stored in the storage portion.

BRIEF DESCRIPTION OF THE DRAWINGS

Embodiments will be described below in detail with reference to the accompanying drawings in which.

DETAILED DESCRIPTION

Figure 1:
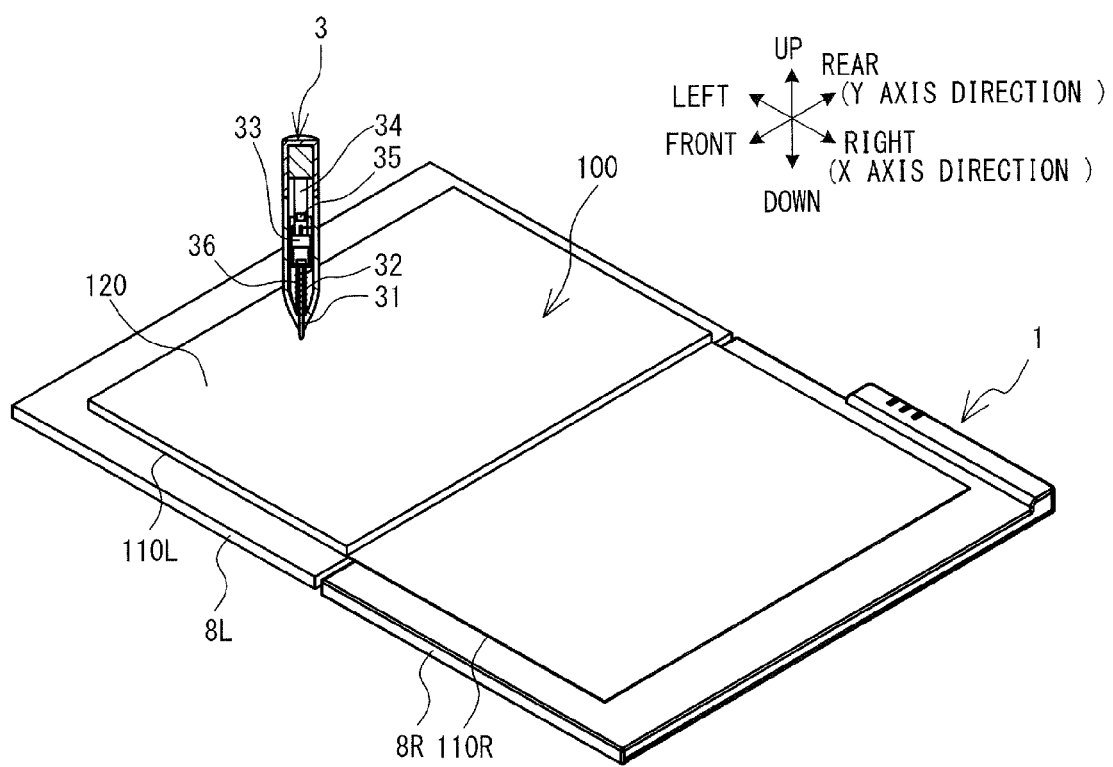
FIG. 1 is a perspective view of an information input device.

Hereinafter, an embodiment will be explained with reference to the drawings. An overview of an information input device 1 according to the present embodiment will be explained with reference to FIG. 1. In the explanation that follows, the upper left side, the lower right side, the top side, the bottom side, the lower left side, and the upper right side in FIG. 1 are respectively the left side, the right side, the top side, the bottom side, the front side, and the rear side of the information input device 1.

A user may use an electronic pen 3 to write information on a paper medium 100 that is mounted on the information input device 1. The information input device 1 is a thin and lightweight handwriting input device that can detect and digitize positions of the electronic pen 3 over time. The information input device 1 includes housings 8L and 8R. The housings 8L and 8R are each made of resin and have a thin rectangular plate shape. The arrangement of the housings 8L and 8R can be changed between a state in which the housings 8L and 8R are open in a two-page spread in the left-right direction, as shown in FIG. 1, and an overlapped state (not shown in the drawings) in which the housings 8L and 8R are overlapped with each other. The housing 8R houses a sensor board 71, a sensor control board 28, and a main board 20 (refer to FIG. 2). The housing 8L houses a sensor board 72 and a sensor control board 29 (refer to FIG. 2).

The electronic pen 3 is a known electromagnetic induction-type of electronic pen and includes a core 31, a coil 32, a variable capacity capacitor 33, a circuit board 34, a capacitor 35, and an ink storage portion 36. The core 31 is provided in the tip portion of the electronic pen 3. The core 31 is urged toward the tip of the electronic pen 3 by an elastic member that is not shown in the drawings. The tip portion of the core 31 protrudes to the outside of a cylindrical body 30. The back end of the core 31 is connected to the ink storage portion 36, which stores ink. The ink storage portion 36 supplies the ink to the core 31. When the user uses the electronic pen 3 to perform writing on a paper sheet 120, a written character (a text character, a numeric character, a graphic, etc.) may be formed by the ink on the paper sheet 120.

The coil 32 is held between the core 31 and the variable capacity capacitor 33 in a state in which the coil 32 is wound around the ink storage portion 36. The variable capacity capacitor 33 is fixed in place in the interior of the electronic pen 3 by the circuit board 34. The capacitor 35 is mounted on the circuit board 34. The capacitor 35 and the variable capacity capacitor 33 are connected in parallel with the coil 32 to configure a known resonance (synchronization) circuit.

The paper medium 100 is a booklet-like medium that can be opened out to a two-page spread in the left-right direction. The paper medium 100 is a paper medium in which a pair of cover sheets (a front cover sheet 110L and a back cover sheet 110R) and a plurality of paper sheets 120 are bound at their respective edge portions. As an example, the paper medium 100 is an A5 size notebook. The paper medium 100 is mounted on the information input device 1 such that the front cover sheet 110L is placed on the upper surface of the housing 8L and the back cover sheet 110R is placed on the upper surface of the housing 8R. The user can write information on the paper sheet 120 using the electronic pen 3 in a state in which the paper medium 100 is mounted on the information input device 1. Position information of the electronic pen 3 that is used to write information on the paper medium 100 is detected by the sensor board 71 or 72 housed in the housing 8L or 8R on which the paper sheet 120, on which the information is written, is placed.

Figure 2:
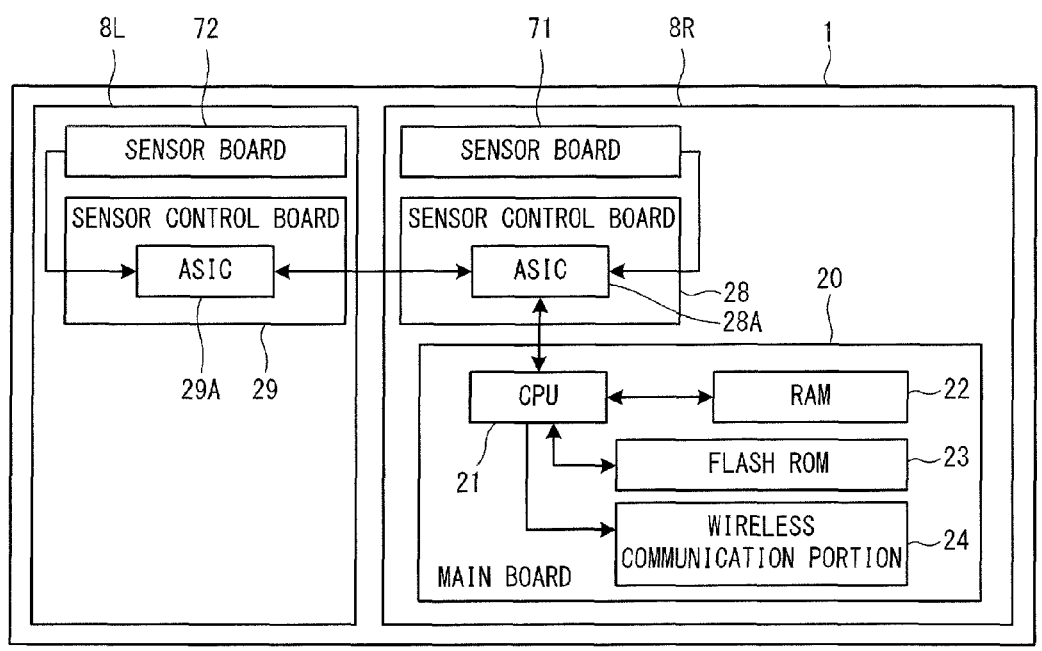
FIG. 2 is a block diagram showing an electrical configuration of the information input device.

An electrical configuration of the information input device 1 will be explained with reference to FIG. 2. The information input device 1 mainly includes the main board 20, the sensor boards 71 and 72, and the sensor control boards 28 and 29. As described above, the housing 8R houses the main board 20, the sensor board 71, and the sensor control board 28. The housing 8L houses the sensor board 72 and the sensor control board 29.

The main board 20 is provided with a CPU 21, a RAM 22, a flash ROM 23, and a wireless communication portion 24. The RAM 22, the flash ROM 23, and the wireless communication portion 24 are electrically connected to the CPU 21. The CPU 21 performs control of the information input device 1. The RAM 22 temporarily stores various data, such as arithmetic operation data. The flash ROM 23 stores various programs that are used by the CPU 21 to control the information input device 1. Further, the flash ROM 23 stores stroke data that indicates a trajectory of the electronic pen 3 that is used to write information on the paper medium 100. The stroke data is structured by adding header information (a stroke header) to data in which a plurality of pieces of position information (coordinate data, for example) of the electronic pen 3 that are detected over time by the sensor board 71 and the sensor board 72 are arranged in an order of detection. The stroke header includes, for example, data piece number information, which indicates the number of pieces of coordinate data included in one set of the stroke data, and time information, which indicates a time at which the stroke data is generated. In other words, the stroke data is data that can reproduce information (a text character, a numeric character, a graphic, etc.) written on the paper sheet 120 by the user, by connecting the individual pieces of coordinate data along a time series. The wireless communication portion 24 is a controller that is used to perform near-field wireless communication with an external electronic device. Although not shown in the drawings, the information input device 1 can transmit the generated stroke data to a personal computer (PC) or the like used by the user, via the wireless communication portion 24.

The sensor boards 71 and 72 are sensors that use an electromagnetic induction method to detect a position of the electronic pen 3 that is in contact with or is close to the sensor boards 71 and 72. The sensor boards 71 and 72 each include a plurality of rectangular loop coils that are arranged at a predetermined interval in an X axis direction (the left-right direction) and a Y axis direction (the up-down direction). The sensor board 71 is electrically connected to an application-specific integrated circuit (ASIC) 28A, which is mounted on the sensor control board 28. An antenna resonance circuit is built into the sensor control board 28. The ASIC 28A controls the sensor board 71 and causes the sensor board 71 to perform an operation to detect a position of the electronic pen 3. When a writing operation using the electronic pen 3 is performed on the housing 8R, which houses the sensor board 71, the ASIC 28A generates coordinate data based on the position of the electronic pen 3 detected by the sensor board 71. In a similar manner, the sensor board 72 is electrically connected to an ASIC 29A, which is mounted on the sensor control board 29. An antenna resonance circuit is built into the sensor control board 29. The ASIC 29A controls the sensor board 72 and causes the sensor board 72 to perform an operation to detect a position of the electronic pen 3. When a writing operation using the electronic pen 3 is performed on the housing 8L, which houses the sensor board 72, the ASIC 29A generates coordinate data based on the position of the electronic pen 3 detected by the sensor board 72. Of the ASIC 28A and the ASIC 29A, the ASIC 28A, which is on the master side, is directly connected to the CPU 21, and outputs the coordinate data to the CPU 21. The ASIC 29A, which is on the slave side, is connected to the CPU 21 via the ASIC 28A, and outputs the coordinate data to the CPU 21.

The principle of an operation by which the sensor boards 71 and 72 detect positions of the electronic pen 3 (hereinafter, this operation is simply referred to as "scanning") will be briefly explained. Based on an instruction of the CPU 21, the ASIC 28A and the ASIC 29A control the sensor control boards 28 and 29, respectively. The sensor control boards 28 and 29 cause an electric current of a specific frequency to flow through the plurality of loop coils of the sensor boards 71 and 72, and generate a magnetic field. If the electronic pen 3 comes close to the sensor board 71 or 72 in this state, a resonance circuit of the electronic pen 3 is caused to resonate as a result of the electromagnetic induction of the loop coils, and an induction field is generated.

Next, the sensor control boards 28 and 29 stop the flow of the electric current to the loop coils and scans each of the loop coils. The electric current generated by the induction field that is caused by the resonance circuit of the electronic pen 3 flows through the loop coils. The electric current flowing through the loop coil that is closest to the electronic pen 3 is relatively large, and the electric current flowing through an adjacent loop coil is relatively small. The sensor control boards 28 and 29 convert the electric current that has flowed through each of the loop coils of the sensor boards 71 and 72 into a voltage value using a differential amplifier circuit (not shown in the drawings), and input the voltage value to the ASIC 28A and the ASIC 29A. The ASIC 28A and the ASIC 29A calculate the position of the electronic pen 3 based on the input voltage value, and output the calculated position to the CPU 21 as the coordinate data.

When the user is writing information on the paper medium 100 using the electronic pen 3, a writing pressure is applied to the core body 31 of the electronic pen 3. The inductance in the coil 32 varies according to the writing pressure applied to the core body 31. Accordingly, the resonance frequency of the resonance circuit of the electronic pen 3 changes. The ASIC 28A and the ASIC 29A detect a change in the resonance frequency (a phase change) and determine whether or not information is being written on the paper medium 100. When it is determined that the user is writing information on the paper medium 100 (the writing pressure is applied to the electronic pen 3) based on the change in the resonance frequency, the ASIC 28A and the ASIC 29A output a pen down signal (a high signal) to the CPU 21. When it is determined that the user is not writing information on the paper medium 100 (the writing pressure of the electronic pen 3 is released) based on the change in the resonance frequency, the ASIC 28A and the ASIC 29A output a pen up signal (a low signal) to the CPU 21. When the CPU 21 receives the pen down signal, the CPU 21 acquires the coordinate data output by the ASIC 28A and the ASIC 29A, generates stroke data, and stores the generated stroke data in the flash ROM 23.

Main processing of the information input device 1 will be explained with reference to FIG. 3 and FIG. 4. When the power source of the information input device 1 is turned on, the CPU 21 outputs an instruction to the ASIC 28A and the ASIC 29A, and supplies electric power to the sensor boards 71 and 72. The ASIC 28A and the ASIC 29A start scanning using the sensor boards 71 and 72. The CPU 21 reads the program stored in the flash ROM 23 into the RAM 22 and performs the main processing (refer to FIG. 3). The main processing is processing in which the CPU 21 generates stroke data based on the coordinate data acquired from the ASIC 28A and the ASIC 29A. In the present embodiment, the CPU 21 thins out the coordinate data in accordance with a predetermined thinning-out condition, and thus generates the stroke data such that an increase in the amount of data is suppressed. The CPU 21 stores the data that is acquired in the course of the processing in the RAM 22, as appropriate.

Figure 3:
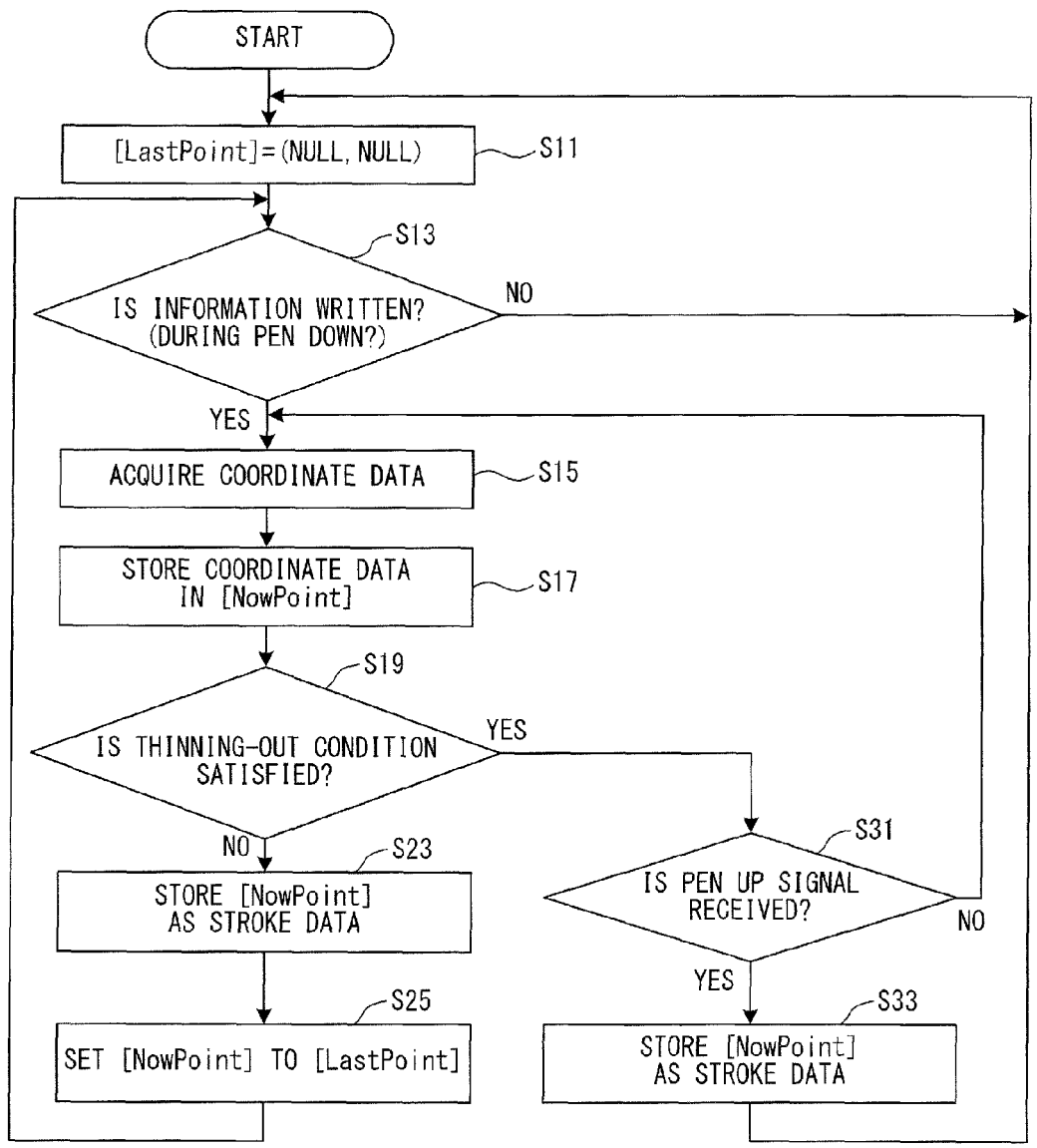
FIG. 3 is a flowchart of main processing.

As shown in FIG. 3, the CPU 21 performs initialization in the main processing. The CPU 21 secures a storage area for the stroke data in the flash ROM 23, and sets an area to which the stroke header is added. The CPU 21 acquires time information from a clock (not shown in the drawings) and stores the time information in the stroke header. The CPU 21 secures storage areas for variables [LastPoint] and [NowPoint] in the RAM 22, and sets a default value (NULL, NULL) as [LastPoint] (step S11, refer to a reference symbol A in FIG. 4). The CPU 21 determines whether or not the pen down signal is received from one of the ASIC 28A and the ASIC 29A (step S13). In a case where the pen down signal is not received from one of the ASIC 28A and the ASIC 29A (no at step S13), the CPU 21 determines that information is not written using the electronic pen 3 and returns the processing to step S11. Until information is written on the paper medium 100 using the electronic pen 3, the CPU 21 repeats the processing at step S11 and step S13. In a case where the pen down signal is received from one of the ASIC 28A and the ASIC 29A (yes at step S13), the CPU 21 acquires the coordinate data output by one of the ASIC 28A and the ASIC 29A (step S15). The CPU 21 stores the acquired coordinate data in [NowPoint] (step S17, refer to an arrow B in FIG. 4).

The CPU 21 determines whether or not the acquired coordinate data satisfies the thinning-out condition (step S19). In the present embodiment, the condition that [NowPoint] and [LastPoint] are the same coordinate data is set in advance as the thinning-out condition. The CPU 21 compares [NowPoint] and [LastPoint]. In a case where the coordinate data of [NowPoint] is not the same as the coordinate data of [LastPoint], the thinning-out condition is not satisfied (no at step S19). In this case, the CPU 21 adds the coordinate data of [NowPoint] to the end of the stroke data secured in the flash ROM 23, and stores the added coordinate data (step S23) (refer to an arrow C in FIG. 4). The CPU 21 copies the coordinate data of [NowPoint], and sets the copied coordinate data as the coordinate data of [LastPoint] (step S25) (refer to an arrow D in FIG. 4), and returns the processing to step S13. Although not shown in the drawings, before the CPU 21 returns the processing to step S13 after performing the processing at step S25, the CPU 21 waits until a predetermined time period has elapsed, so that the acquisition of the coordinate data at step S15 is performed periodically.

Figure 4:
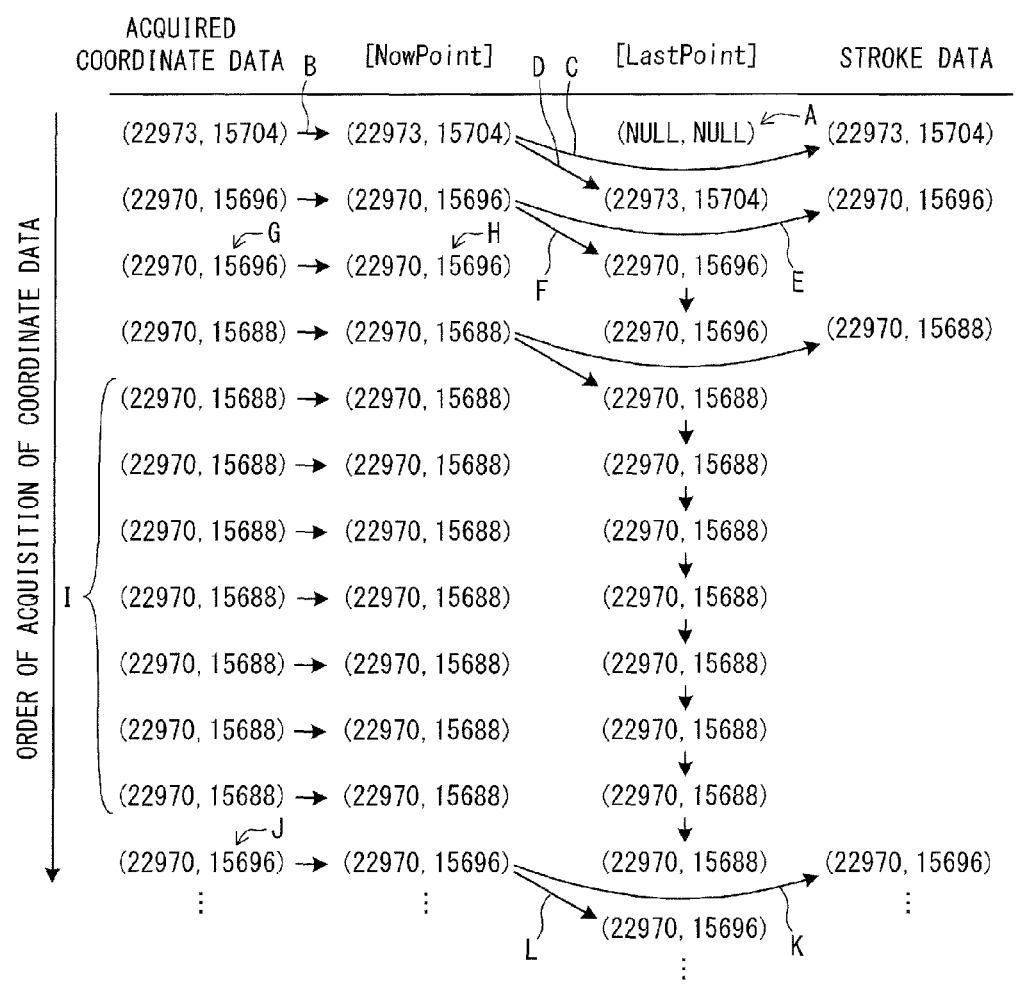
FIG. 4 is a diagram illustrating variables [NowPoint] and [LastPoint] used in the main processing, and coordinate data stored in stroke data.

The CPU 21 repeats the processing at step S13 to step S25 while the same coordinate data is not consecutively acquired, that is, repeats the processing that adds the acquired coordinate data to the stroke data (refer to an arrow E in FIG. 4) and sets the acquired coordinate data as the coordinate data of [LastPoint] (refer to an arrow F in FIG. 4). In a case where the same coordinate data (refer to a reference symbol G in FIG. 4) is consecutively acquired, the coordinate data of [NowPoint] and the coordinate data of [LastPoint] are the same and the thinning-out condition is satisfied (yes at step S19). In this case, the CPU 21 determines whether or not the pen up signal is received (step S31). In a case where the user is continuing to write information, the CPU 21 does not receive the pen up signal (no at step S31). In this case, the CPU 21 returns the processing to step S15. Therefore, in this round of the processing, the coordinate data (refer to a reference symbol H in FIG. 4) that is stored in [NowPoint] is not added to the stroke data and is thinned out. Although not shown in the drawings, in a similar manner to when the CPU 21 returns the processing to step S13 after performing the processing at step S25, if the pen up signal is not received in the processing at step S31 (no at step S31), the CPU 21 waits until a predetermined time period elapses before the CPU 21 returns the processing to step S15, so that the acquisition of the coordinate data at step S15 is performed periodically.

After that, in a similar manner to that described above, while the same coordinate data as the coordinate data of [LastPoint] is consecutively acquired (step S15, step S17, yes at step S19, no at step S31) (refer to a reference symbol I in FIG. 4), the CPU 21 thins out the acquired coordinate data and does not add the acquired coordinate data to the stroke data. In a case where the CPU 21 acquires coordinate data that is different from the coordinate data of [LastPoint] (no at step S19) (refer to a reference symbol J in FIG. 4), the CPU 21 adds the acquired coordinate data to the stroke data (step S23) (refer to a reference symbol K in FIG. 4), and sets the acquired coordinate data as the coordinate data of [LastPoint] (step S25) (refer to a reference symbol L in FIG. 4).

After the CPU 21 performs the processing that generates the stroke data, if the pen up signal is received from the ASIC 28A and the ASIC 29A (no at step S13), the CPU 21 completes the generation of the stroke data and returns the processing to step S11. The CPU 21 counts up the number of the pieces of coordinate data added to the stroke data, and stores the number in the stroke header as the data piece number information. The CPU 21 secures a new storage area for the stroke data in the flash ROM 23, and sets an area to which the stroke header is added. Then, the CPU 21 repeats the processing at step S11 and step S13 until information is newly written on the paper medium 100 using the electronic pen 3.

After the CPU 21 determines at step S19 that the acquired coordinate data satisfies the thinning-out condition (yes at step S19), if the pen up signal is received from the ASIC 28A and the ASIC 29A (yes at step S31), the CPU 21 advances the processing to step S33. The CPU 21 adds the coordinate data stored in [NowPoint] by the processing at step S17 to the end of the stroke data secured in the flash ROM 23, and stores the added coordinate data (step S33). More specifically, when the CPU 21 acquires the same coordinate data (yes at step S19) and thins out the coordinate data, if the user ends the writing of information on the paper medium 100 and separates the electronic pen 3 from the paper medium 100 (yes at step S31), the CPU 21 adds the latest acquired coordinate data (the coordinate data acquired immediately before the pen up) to the stroke data (step S33), and completes the generation of the stroke data. The CPU 21 returns the processing to step S11 and stands by until information is newly written on the paper medium 100 using the electronic pen 3 (step S11, no at step S13).

As explained above, in a case where the coordinate data that is the same as the coordinate data of [LastPoint] is acquired, the information input device 1 of the present embodiment does not add the acquired coordinate data to the stroke data and thins out the acquired coordinate data. Therefore, the information input device 1 can suppress the increase in the amount of information of the stroke data. It is thus possible to reduce the area of the flash ROM 23 in which the stroke data is stored. Further, in a case where the stroke data is used on a PC or the like, it is possible to reduce a time period required to transmit the stroke data from the information input device 1 to the PC or the like.

At step S19, the CPU 21 can perform the determination processing as to whether or not the thinning-out condition is satisfied, by determining whether or not the coordinate data of [LastPoint] is the same as the coordinate data of [NowPoint]. Therefore, the information input device 1 can reduce a load involved in the determination processing, and can rapidly determine whether or not the acquired coordinate data is to be added to the stroke data.

Various modifications can be made to the above-described embodiment. In the above-described embodiment, the condition that the coordinate data of [Nowpoint] is the same as the coordinate data of [Lastpoint] is set as the thinning-out condition, and at step S19 of the main processing, the CPU 21 determines whether or not the thinning-out condition is satisfied. For example, a condition that the distance between the position indicated by the coordinate data of [NowPoint] and the position indicated by the coordinate data of [LastPoint] is less than a predetermined distance may be set as the thinning-out condition. The operation of the main processing that is performed in this case will be explained as a first modified example with reference to FIG. 3 and FIG. 5.

Figure 5:
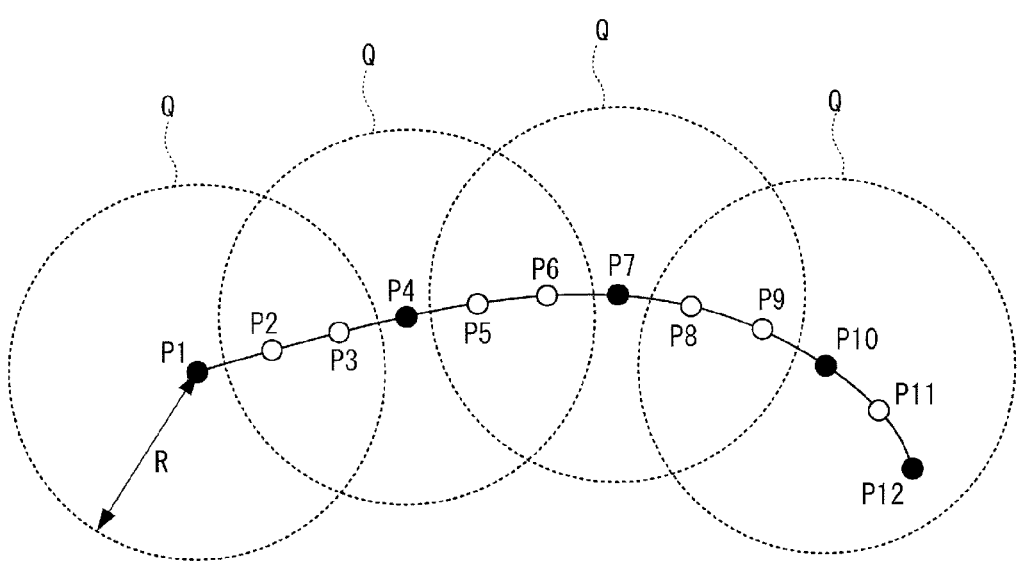
FIG. 5 is a diagram illustrating a first modified example in which, when the acquired coordinate data indicates proximate coordinates of the coordinate data of [LastPoint], the acquired coordinate data is not added to the stroke data.

As shown in FIG. 3 and FIG. 5, in a case where the CPU 21 receives the pen down signal during standby (yes at step S13), the CPU 21 acquires coordinate data P1 (refer to FIG. 5) from one of the ASIC 28A and the ASIC 29A (step S15), and stores the coordinate data P1 in [NowPoint] (step S17). The CPU 21 calculates a distance between the position indicated by the coordinate data of [NowPoint] and the position indicated by the coordinate data of [LastPoint], and determines whether or not the calculated distance is less than a predetermined distance R (step S19). Immediately after the CPU 21 has received the pen down signal, (NULL, NULL) is set as [LastPoint]. Therefore, the CPU 21 determines that the calculation of the distance is not valid, and determines that the thinning-out condition is not satisfied (no at step S19). Therefore, the CPU 21 adds the coordinate data P1 to the stroke data (step S23), and sets the coordinate data P1 as the coordinate data of [LastPoint] (step S25).

The CPU 21 acquires next coordinate data P2 and stores the coordinate data P2 in [NowPoint] (step S15, step S17). The CPU 21 determines whether or not a distance between the position indicated by the coordinate data of [NowPoint] and the position indicated by the coordinate data P1 of [LastPoint] is less than the predetermined distance R. More specifically, the CPU 21 determines whether or not the coordinates indicated by the coordinate data P2 are included within a virtual circle Q, which is centered on the coordinates indicated by the coordinate data P1 and whose radius is the predetermined distance R. The predetermined distance R is, for example, 5 dots when each coordinate set is represented by a dot. The coordinates indicated by the coordinate data P2 are proximate coordinates whose distance from the coordinates indicated by the coordinate data P1 is less than the predetermined distance R (yes at step S19). In this case, the CPU 21 does not add the coordinate data P2 to the stroke data and acquires next coordinate data P3. The CPU 21 does not add the coordinate data P3 that satisfies the thinning-out condition to the stroke data, and acquires next coordinate data P4 (no at step S31, step S15). The CPU 21 stores the newly acquired coordinate data P4 in [NowPoint] (step S17). The CPU 21 calculates a distance between the position indicated by the coordinate data P4 of [NowPoint] and the position indicated by the coordinate data P1 of [LastPoint]. In a case where the calculated distance is equal to or more than the predetermined distance R and the thinning-out condition is not satisfied (no at step S19), the CPU 21 adds the coordinate data P4 to the stroke data (step S23), and sets the coordinate data P4 as the coordinate data of [LastPoint].

After that, in a similar manner to that described above, the CPU 21 does not add coordinate data P5, P6, P8, P9, and P11 to the stroke data and thins them out. The coordinate data P5, P6, P8, P9, and P11 each indicate a position whose distance from the position indicated by the coordinate data of [LastPoint] is less than the predetermined distance R. The CPU 21 adds coordinate data P7 and P10 to the stroke data and sets each of the coordinate data P7 and P10 as a new [LastPoint]. The coordinate data P7 and P10 each indicate a position whose distance from the position indicated by the coordinate data of [LastPoint] is equal to or more than the predetermined distance R. The CPU 21 acquires coordinate data P12, which indicates a position whose distance from the position indicated by the coordinate data P10 of [LastPoint] is less than the predetermined distance R, and which satisfies the thinning-out condition (yes at step S19). After that, if the pen up signal is received (yes at step S31), the CPU 21 does not thin out the coordinate data P12 and adds the coordinate data P12 to the stroke data (step S33).

As described above, in the first modified example, the thinning-out condition is that the distance between the position indicated by the coordinate data of [NowPoint] and the position indicated by the coordinate data of [LastPoint] is less than a predetermined distance. In other words, the CPU 21 can thin out the acquired coordinate data without adding the acquired coordinate data to the stroke data not only when the coordinates indicated by the acquired coordinate data are the same as the coordinates indicated by the coordinate data of [LastPoint], but also when the coordinates indicated by the acquired coordinate data are coordinates in the vicinity of the coordinates indicated by the coordinate data of [LastPoint]. Therefore, the information input device 1 can further suppress the increase in the amount of information of the stroke data.

Figure 6:
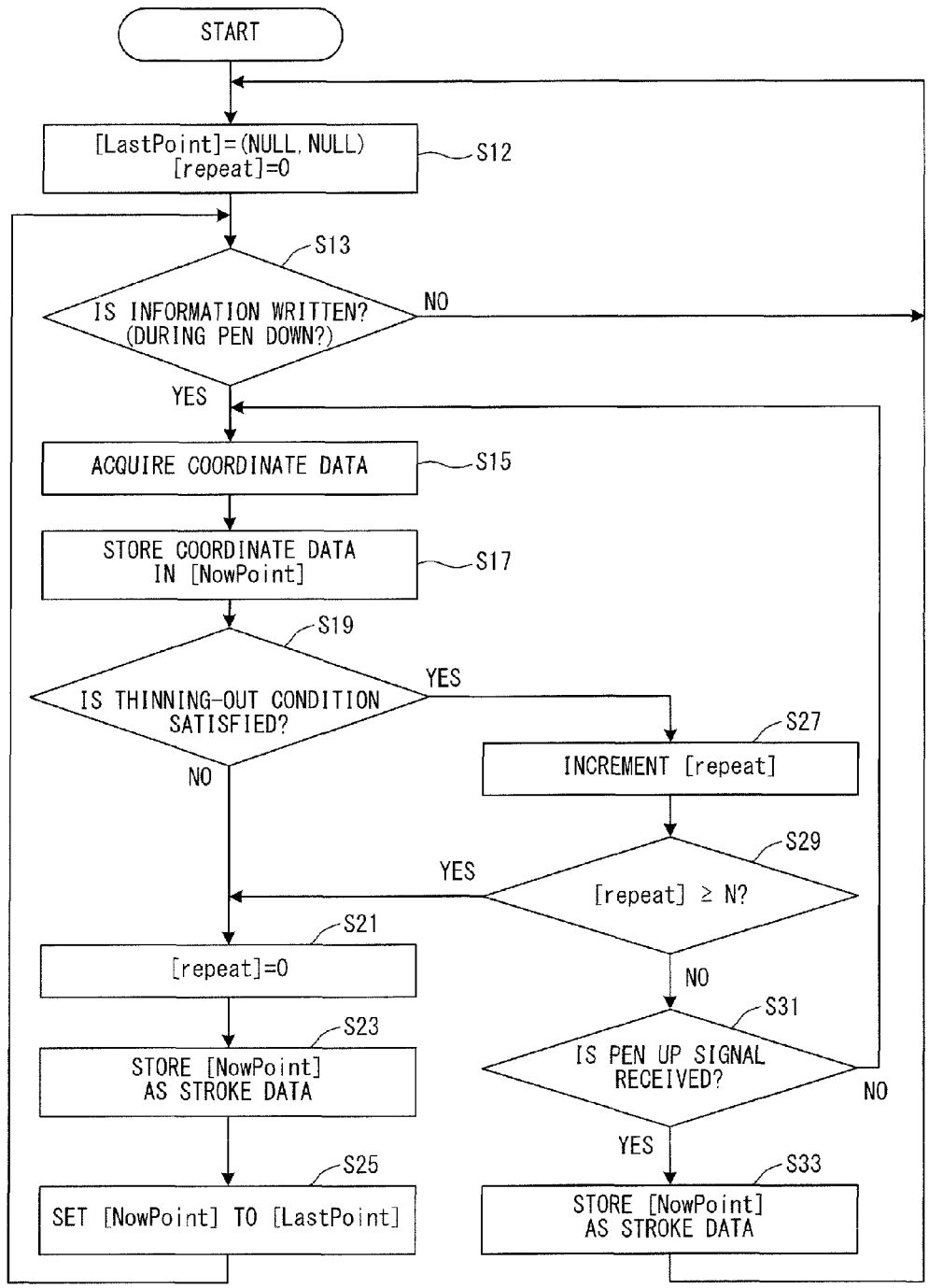
FIG. 6 is a flowchart of main processing according to a second modified example.

In the above-described embodiment, in a case where the CPU 21 consecutively acquires the coordinate data that is the same as the coordinate data of [LastPoint], the CPU 21 thins out the same coordinate data and generates the stroke data. In a case where the CPU 21 consecutively acquires the coordinate data that is the same as the coordinate data of [LastPoint], the CPU 21 may add, to the stroke data, the coordinate data that is acquired once in a predetermined number of times N. The operation of the main processing that is performed in this case will be explained as a second modified example with reference to FIG. 6. In FIG. 6, processing that is the same as the processing in the main processing of the present embodiment explained with reference to FIG. 3 is denoted by the same step number and an explanation thereof is simplified.

As shown in FIG. 6, the CPU 21 performs the initialization in the main processing, and secures a storage area for the stroke data in the flash ROM 23, and secures storage areas for the variables [LastPoint] and [NowPoint] and a counter [repeat] in the RAM 22. The CPU 21 sets the default value (NULL, NULL) as [LastPoint] and sets 0 as [repeat] (step S12). Then, in the same manner as in the above-described embodiment, the CPU 21 repeats the processing at step S12 and step S13 until information is written on the paper medium 100 using the electronic pen 3.

In a case where the pen down signal is received from one of the ASIC 28A and the ASIC 29A (yes at step S13), the CPU 21 acquires coordinate data (step S15) and stores the acquired coordinate data in [NowPoint] (step S17). In a case where the coordinate data of [NowPoint] is not the same as the coordinate data of [LastPoint] and the thinning-out condition is not satisfied (no at step S19), the CPU 21 sets 0 as [repeat] (step S21). The CPU 21 adds the coordinate data of [NowPoint] to the stroke data (step S23). The CPU 21 sets the coordinate data of [NowPoint] as the coordinate data of [LastPoint] (step S25) and returns the processing to step S13.

While the same coordinate data is consecutively not acquired, the CPU 21 repeats the processing at step S13 to step S25, and repeats the processing that adds the acquired coordinate data to the stroke data and then sets the acquired coordinate data as the coordinate data of [LastPoint]. In a case where the same coordinate data is consecutively acquired, the coordinate data of [NowPoint] and the coordinate data of [LastPoint] are the same and the thinning-out condition is satisfied (yes at step S19). In this case, the CPU 21 increments [repeat] by adding 1 to [repeat] (step S27). In a case where [repeat] is not equal to or more than the predetermined number of times N (no at step S29) and the pen up signal is not received (no at step S31), the CPU 21 returns the processing to step S15. Therefore, in this round of the processing, the coordinate data stored in [NowPoint] is not added to the stroke data and is thinned out.

While the coordinate data that is the same as the coordinate data of [LastPoint] is consecutively acquired, the CPU 21 increments [repeat] (step S27) and thins out the acquired coordinate data. In a case where [repeat] reaches the predetermined number of times N (three, for example) (yes at step S29), the CPU 21 returns the processing to step S21. The CPU 21 resets [repeat] to 0 (step S21), adds the coordinate data of [NowPoint] to the stroke data (step S23), and then sets the coordinate data of [NowPoint] as the coordinate data of [LastPoint] (step S25). Then, in the same manner as described above, while the coordinate data that is the same as the coordinate data of [LastPoint] is consecutively acquired, the CPU 21 increments [repeat] and thins out the acquired coordinate data.

After the CPU 21 performs the processing that generates the stroke data, if the pen up signal is received (no at step S13), the CPU 21 ends the generation of the stroke data and returns the processing to step S12. The CPU 21 secures a new storage area for the stroke data. Until information is newly written on the paper medium 100 using the electronic pen 3, the CPU 21 repeats the processing at step S12 and step S13. After the CPU 21 thins out the coordinate data, if the pen up signal is received (yes at step S31), the CPU 21 adds the coordinate data stored in [NowPoint] in the processing at step S17 to the end of the stroke data, and stores the added coordinate data (step S33). The CPU 21 completes the generation of the stroke data and returns the processing to step S12.

As described above, in the second modified example, in a case where the coordinate data that satisfies the thinning-out condition is consecutively acquired, the CPU 21 can add, to the stroke data, the coordinate data that is acquired once in the predetermined number of times N, without thinning out the acquired coordinate data. Therefore, the information input device 1 can secure accuracy of information while suppressing the increase in the amount of information of the stroke data.

In a similar manner to the first modified example, also in the second modified example, the thinning-out condition may be, for example, the condition that the distance between the position indicated by the coordinate data of [NowPoint] and the position indicated by the coordinate data of [LastPoint] is less than a predetermined distance. In a case where this type of thinning-out condition is set in the second modified example, the information input device 1 can secure accuracy of information while further suppressing the increase in the amount of information of the stroke data.

The information input device 1 may use a resistive membrane method (a so-called pressure-sensitive method), an electrostatic capacitance method, or another method to detect the electronic pen 3 that is in contact with or is close to the housings 8L and 8R that house the sensor boards 71 and 72. The size, the format, the material and the like of the paper medium 100 are not limited to those of the above-described embodiment.

The ASIC 28A and the ASIC 29A may convert the electric current that flows through the loop coils of each of the sensor boards 71 and 72 into a voltage value. Then, the ASIC 28A and the ASIC 29A may perform analog/digital conversion of the obtained voltage value and output the converted voltage value to the CPU 21. The CPU 21 may generate the coordinate data based on the voltage value obtained from each of the ASIC 28A and the ASIC 29A.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An information input device comprising:
    a detection portion configured to detect a position of a writing portion being in contact with or close to the detection portion;
    a processor; and
    a memory storing computer-readable instructions, wherein the computer-readable instructions, when executed by the processor, cause the information input device to perform processes comprising:
        (a) acquiring position information at a predetermined time interval, the position information being information of positions detected by the detection portion;
        (b) setting, as reference position information, first position information indicating a position detected by the detection portion;
        (c) setting, as further position information, second position information indicating a position detected by the detection portion subsequently to detecting the position of the first position information;
        (d) prior to determining whether position information for a position detected by the detection portion subsequently to detecting the position of the further position information exists:
            determining whether a distance between the position indicated by the reference position information and the position indicated by the further position information is less than a threshold value;
            storing, as information configuring trajectory information, the further position information in a storage portion in response to determining that the distance is not less than the threshold value, the trajectory information being information indicating a trajectory of the writing portion;
            in response to determining the distance between the position indicated by the reference position information and the position indicated by the further position information is less than the threshold value, determining whether the writing portion is not in contact with or is not close to the detection portion; and
            in response to determining that the distance between the position indicated by the reference position information and the position indicated by the further position information is less than the threshold value, and that the writing portion is not in contact with or is not close to the detection portion, storing, as the information configuring the trajectory information, the further position information in the storage portion.

2. The information input device according to claim 1, wherein
    the storing, as the information configuring the trajectory information, the further position information in the storage portion includes storing the further position information, as the information configuring the trajectory information, in the storage portion in response only to determining that the distance is not less than the threshold value.

3. The information input device according to claim 1, wherein
    the determining whether the distance is less than the threshold value includes determining whether the distance is zero.

4. The information input device according to claim 1, wherein
    the computer-readable instructions, when executed by the processor, further cause the information input device to perform processes comprising:
        counting a number of times that it is consecutively determined that the distance is less than the threshold value; and
        determining whether the counted number of times reaches a predetermined number of times, and
    the storing, as the information configuring the trajectory information, the further position information in the storage portion includes storing the further position information in the storage portion upon the counted number of times reaching the predetermined number of times.

5. A non-transitory computer-readable medium storing computer-readable instructions that, when executed by a processor of an information input device, cause the information input device to perform processes comprising:
    acquiring position information at a predetermined time interval, the position information being information of positions detected by a detection portion, the detection portion being configured to detect a position of a writing portion being in contact with or close to the detection portion;
    setting, as reference position information, first position information indicating a position detected by the detection portion;
    setting, as further position information, second position information indicating a position detected by the detection portion subsequently to detecting the position of the first position information;
    prior to determining whether position information for a position detected by the detection portion subsequently to detecting the position of the further position information exists:
        determining whether a distance between the position indicated by the set reference position information and the position indicated by the further position information is less than a threshold value;

storing, as information configuring trajectory information, the further position information in a storage portion in response to determining that the distance is not less than the threshold value, the trajectory information being information indicating a trajectory of the writing portion;

in response to determining the distance between the position indicated by the reference position information and the position indicated by the further position information is less than the threshold value, determining whether the writing portion is not in contact with or is not close to the detection portion; and in response to determining that the distance between the position indicated by the reference position information and the position indicated by the further position information is less than the threshold value, and that the writing portion is not in contact with or is not close to the detection portion, storing, as the information configuring the trajectory information, the further position information in the storage portion.

6. The non-transitory computer-readable medium according to claim 5, wherein the storing, as the information configuring the trajectory information, the further position information in the storage portion includes storing the further position information, as the information configuring the trajectory information, in the storage portion in response only to determining that the distance is not less than the threshold value.

7. The non-transitory computer-readable medium according to claim 5, wherein the determining whether the distance is less than the threshold value includes determining whether the distance is zero.

8. The non-transitory computer-readable medium according to claim 5, wherein the computer-readable instructions, when executed by the processor, further cause the information input device to perform processes comprising:

counting a number of times that it is consecutively determined that the distance is less than the threshold value; and determining whether the counted number of times reaches a predetermined number of times, and the storing, as the information configuring the trajectory information, the further position information in the storage portion includes storing the further position information in the storage portion upon the counted number of times reaching the predetermined number of times.

9. The information input device according to claim 1, wherein the instructions, when executed, further cause the information input device to perform:

setting, as the reference position information, third position information indicating a position detected by the detection portion subsequently to detecting the position of the second position information;

setting, as the further position information, fourth position information indicating a position detected by the detection portion subsequently to detecting the position of the third position information; and repeating step (d).

* * * * *